US006833145B1

(12) United States Patent
Hirata et al.

(10) Patent No.: US 6,833,145 B1
(45) Date of Patent: Dec. 21, 2004

(54) WATER CONTAINING FULLERENES AND METHOD FOR PRODUCING THE SAME

(75) Inventors: Yoshihiro Hirata, Kyoto (JP); Yoshio Ueda, Kyoto (JP); Hiroaki Takase, Kyoto (JP)

(73) Assignee: Phild Co., Ltd., Kyoto (JP)

( * ) Notice: Subject to any disclaimer, the term of this patent is extended or adjusted under 35 U.S.C. 154(b) by 359 days.

(21) Appl. No.: 09/868,737

(22) PCT Filed: Jul. 21, 2000

(86) PCT No.: PCT/JP00/04894

§ 371 (c)(1),
(2), (4) Date: Oct. 15, 2001

(87) PCT Pub. No.: WO01/28921

PCT Pub. Date: Apr. 26, 2001

(30) Foreign Application Priority Data

Oct. 22, 1999 (JP) ............................................ 11/301149

(51) Int. Cl.[7] .................................................. A23L 2/00
(52) U.S. Cl. ......................... 426/66; 426/474; 426/590; 422/231
(58) Field of Search ........................ 426/66, 474, 590; 422/231

(56) References Cited

U.S. PATENT DOCUMENTS 5,811,460 A * 9/1998 Friedman et al. ............ 514/563
5,985,232 A * 11/1999 Howard et al. ............ 423/447.3
6,162,411 A * 12/2000 Howard et al. ............ 423/445 B
6,204,391 B1 * 3/2001 Friedman et al. ............ 548/338.1

FOREIGN PATENT DOCUMENTS

| JP | 5-294605 | 11/1993 |
| JP | 10-45408 | 2/1998 |

OTHER PUBLICATIONS

Craig Collins, et al., High–resolution $2_H$ solid–state NMR study of water intercalated in fullerene $C_{60}$, Chemical Physics Letters No. 289, No. 3,4, Jun. 12, 1998, pp. 338–340.

Vovk O.M., et al., Mass–Spectral Investigation of the Water Fullerene Solutions, Phys. Chem. Fullerenes Deriv., (1995), pp. 77–80.

Grigoriy V. Andrievsky, et al. On the Prodction of an aqueous Coltoidal Solution of Fullerenes, J. Chem. Soc. Chem. Commun. No. 12 (1995), pp. 1281–1282.

* cited by examiner

Primary Examiner—N. Bhat
(74) Attorney, Agent, or Firm—Knobbe, Martens, Olson & Bear LLP

(57) ABSTRACT

A method and an apparatus for producing healthy drinking water containing fullerenes, which is excellent as healthy water, are provided. In high-pressure water, by burning a mixed gas of oxygen and hydrogen and burning carbon using the combustion gas generated, water containing fullerenes, which include water molecules and are floating in water, is produced. The water containing fullerenes obtained is useful as healthy drinking water.

7 Claims, 4 Drawing Sheets

A flow chart of producing water containing fullerenes

FIG. 1  A flow chart of producing water containing fullerenes

FIG. 4  Various Properties of $C_{60}$ (prepared based on a table from Chemistry, 46, 830, 1990)

| Properties (Physical Quantity) | Measured Value, etc. | Properties (Physical Quantity) | Measured Value, etc. |
|---|---|---|---|
| · Molecular weight: | 720.66 | · Electron affinity: | 2.65±0.02 eV |
| · No. of molecules: | 720 | · Reduction potential ($E^{1/2}$ vs Fc/Fc⁺), acetonitrile/toluene, (Et₄N) BF₄(liquid), -10 °C: | -0.98, -1.37, -1.87, -2.35, -2.85, -3.26 (V) |
| · Molecular structure: | Frustum icosahedron ($I_h$), Diameter: ~7.1Å C-C bond shared by two six-membered rings 1.391Å C-C bond forming a five-membered ring 1.455Å | · Crystal structure: | Simple cubic system (249K or less) Pa3, Z=4, a=14.04Å (5K) Face-centered cubic system (249K or more) Fm3, z=4, a=14.17±0.01Å (300K) |
| · ¹³C-NMR spectrum ($C_6D_6$) | δ= 143.27 ppm | | Distance between the center of adjacent molecules:~10.0Å |
| · Infrared adsorption spectrum (KBr pellet)/cm⁻¹ | 527.4, 576.4, 1182.4, 1428.5 | · Density | 1.729 g/cm⁻⁹ (5K, calculated value) 1.682 g/cm⁻⁹ (300K, calculated value) |
| · Infrared emission spectrum (vapor-phase, 850±100°C)/cm⁻¹ | 527.1, 570.3, 1169.1, 1406.9 | · Compressibility (0~20GPa): | (5.5±0.5)×10⁻²GPa⁻¹ |
| · Raman spectrum (thin film)/cm⁻¹ | 273(s), 437(m), 496(s), 710(m), 774(m), 1099(w), 1250(w), 1428(m), 1470(vs), 1575(m) | · Melting point: · Heat of sublimation: | >700°C -4.83 kJ/mol |
| · Visible ultraviolet spectrum (hexane solution, log ε in parentheses)/nm: | 211(5.11), 227(sh,4.91), 256(5.24), 328(4.71), 390(3.52), 403(3.48), 492(sh,2.72), 540(2.85), 568(2.78), 590(2.86), 598(2.87), 620(2.60) | · Conductivity (at room temp.): · Molar magnetic susceptibility · Transition temp. of superconducting salt Tc/K: | 9.58±0.31 kJ/mol <10⁻⁹ Scm⁻¹ -(260±20)×10⁻⁶ emu/mol $K_3C_{60}(18)$, $Rb_3C_{60}(28,30)$, $Rb_2CsC_{60}(31)$, $RbCs_2C_{60}(33)$, $K_2CsC_{60}(24)$, $Na_2CsC_{60}(12)$, $Na_2RbC_{60}(s.5)$, $Na_2KC_{60}(2.5)$, $Li_2CsC_{60}(12)$, $Ca_xC_{60}(8.4)$, $Sn_xC_{60}(12)$ |
| · Fluorescence spectrum (toluene solution, at room temp.)/nm | No observation (thin film, 20K), 706.7(main), 787.4, 877(sh) | · Curie temp. of ferromagnetic salt: | $TDAE_{0.5}C_{60}$  16.1K |
| · Triplet energy (toluene solution) | 1.56±0.03 eV (8.60±0.14 kJ/mol) | | |
| · Ionization potential | 7.61±0.02 eV | | |

*Curie temperature: Temperature at which a paramagnetic substance changes to a ferromagnetic substance when it is cooling down.
TDAE indicates tetrakis(dimethylaminoethylene.
(Source; K. Taniyaki & others, Fullerene, Sangyo-tosho, Oct. 27, 1992, P.16)

WATER CONTAINING FULLERENES AND METHOD FOR PRODUCING THE SAME

FIELD OF THE INVENTION

The present invention relates to water containing fullerenes. It relates to a method for producing water containing fullerenes floating, which comprise 60 carbon atoms forming a spheroidal structure, and an apparatus for producing the same, and healthy drinking water obtained from the same.

BACKGROUND OF THE INVENTION

Since long ago, charcoal and carbon have been of use in various ways in various fields, and found useful particularly for deodorization and preservation from decay, etc. Carbon's effects on the human body in health and medical treatment have also been recognized. Coping with recent social trends in health consciousness, use of carbon for health-related aspects is seen in a new light. Bicho-charcoal and bamboo charcoal are sold and used for water quality improvement and cooking, and charcoal and carbon are increasingly attracting attention.

In fields of using charcoal and carbon materials, a new material called "fullerene" was discovered more than ten years ago and was recognized as the third crystallization following diamond and graphite. In 1990, German and US joint research successfully isolated fullerenes from soot produced under special conditions. Since it was reported that a potassium-metal-doped fullerene film exhibited superconductivity at the critical temperature of 18K, fullerene research has accelerated at a stretch. Due to good prospects for mass production methods for isolating fullerenes and physical properties exhibited by fullerenes, it attracts researchers' curiosities in both basic and applied disciplines still more. If fullerene research and technological development should advance to health-related fields, a Nobel prize will be awarded for such achievements (K. Tanigaki, K. Kikuchi, Y. Ajiha, & K. Iriyama. Fullerene. Sangyo-tosho Co. Ltd., October 1992, xvii.)

Typically, a fullerene comprises 60 carbon atoms forming a spheroidal structure. It is a carbon molecule with a structure of a soccer-ball like pattern combining pentagons and hexagons. It is a physically and chemically stable molecule and is known to have physical properties shown in FIG. 4 (op. cit. p.16).

Synthesis of a fullerene by a chemical reaction has not been reported. As described above, producing fullerene by physical methods has become possible. A typical production method is that: graphite is vaporized by arc discharge or laser beam irradiation to generate carbon vapor, the carbon vapor is cooled down to form soot, and a fullerene is generated in soot. Fullerene obtained by these methods has a soccer-ball like structure of 60 carbon atoms forming a spheroidal structure as shown in FIG. 3. This structure is considered to form as follows: Graphite is isolated from impurities; A five-hexagon structure changes to a morning-glory-flower-shape like structure; Carbon atoms are rearranged to approach a spherical shape and changes to a soccer-ball shape, which is energy-wise a stable structure. Fullerene generated in soot is isolated and refined by dissolving it in a solution using a refining method such as a column liquid chromatography method, etc.

The soccer-ball like structure of fullerene has been confirmed by a $C_{60}$ peak by a mass spectrum, crystal structure analysis by an X-ray, and a $^{13}C$-NMR spectrum, an infrared absorption spectrum, etc.

Thus, as production and refining methods for fullerene have been established and its physical and chemical properties have become clear, it attracts attention as a new next-generation functionality material and its serviceable use in various fields begins developing. Technologies for using fullerene are being developed: for example, in the electronics field it is used as a superconductive material, a semiconductor material or a material with strong magnetism; in the physical material field as a non-linear optical material, a catalyst, etc.; in the mechanical material field, as micro lubricant, a buffer agent, etc. Furthermore, use of fullerene for bioactive materials, food materials or medicines is also being proposed.

Additionally, although its details are not clear, it is reported that development of a new structural material including metal atoms such as K or La inside a spheroidal structure also attracted interests.

It is usual that a number of patent applications are reported as a new material technology develops. Fullerene is no exception to this rule. A wide range of patent information from improvement of methods for producing and refining fullerene to using it in the electronics, physical material or mechanical material fields has been laid open. Almost no patent journal information on use of fullerene for bioactive materials, food materials or medicines has been laid open. If seeing a few technologies laid open until now in these fields, technologies which have been reported include: method for preserving the high degree of freshness and quality by infiltrating an ultrafine particle carbon composition solution containing fullerenes into food such as grain reported in the Japanese Patent Laid-open No.10-45408 journal, method for inactivating a virus by oxygen in a singlet state where fullerenes are activated and by applying rays reported in the Japanese Patent Laid-open No.9-322767 journal, cosmetic for sunburn care containing fullerenes dissolved in its oil ingredient, whose color is inconspicuous when applied and which is excellent in sunburn protection reported in the Japanese Patent Laid-open No.9-278825 journal, etc.

Application of fullerene to bioactive materials, food materials or medicines is extremely important as technological development directly related to daily life and the scope of use is expected to expand. In the medical field, research on fullerene as a substance to enhance immunity effects of a living body is being conducted for cancer treatment purpose, etc. For example, if fullerene with fixed molecular weight is given to a leukocyte, production of an immune substance is stimulated. Because fullerene is made of carbon in its entirety, its destruction speed in the body system is remarkably slow, which makes it possible to be absorbed into the intestinal tract in the unit of nm, which is different in size from regular charcoal.

The Invention Laid Open

As described above, expansion of fullerene's application to bioactive materials, food materials or medicines is greatly hoped for. The present invention aims to solve the above-mentioned problem with the object of making the best use of this apparently unlimited serviceability of fullerene particularly in the fields of bioactive materials, food materials or medicines.

Having come to discover that using water containing fullerenes for drinking can improve the condition of health, for example, improving bioactive functions, the inventors of the present invention completed the present invention.

A problem to be solved by the present invention is to provide a method for efficiently producing water containing fullerenes, which contributes to improvement of health conditions, and an apparatus for producing the same.

In other words, the present invention aims to contribute to technological development of fullerene and expansion of its applications by solving the above-mentioned problem. It has developed a new method for producing water containing fullerenes and an apparatus for producing the same, and healthy drinking water utilizing the newly developed water containing fullerenes.

In the present invention, water containing fullerenes which include water molecules is referred to as "water containing fullerenes".

Fundamental characteristics of the present invention are to generate fullerenes which include water molecules and drinking water in which fullerenes are floating by producing fullerenes in high-pressure water. Specifically, the characteristics of the present invention are listed in (1) to (4) below.

A method for producing water containing fullerenes, which include water molecules and are floating in water, by burning a mixed gas of oxygen and hydrogen in high-pressure water and burning a graphite bar with a combustion gas generated.

An apparatus for producing water containing fullerenes, which include water molecules and are floating in water. The apparatus possesses a tank holding high-pressure water, a jet nozzle for a mixed gas of oxygen and hydrogen, a graphite bar, an ignition system and a combustion chamber.

The apparatus for producing water containing fullerenes described in (2) above, which is characterized in that a mixed gas fuel of oxygen and hydrogen is provided by electrolyzing water.

Healthy drinking water obtained by purifying water containing fullerenes, which include water molecules and are floating in water.

The most important characteristic of the present invention is based on new knowledge that, unlike water containing fullerenes in which fullerenes simply are floating, the water containing fullerenes according to the present invention, in which fullerenes including water molecules are floating in water, and these water molecules included correlatively act with a fullerene structure to achieve a new and remarkable bioactive action.

In response to recent social trends in health consciousness, healthy drinking water produced according to the present invention by purifying water containing fullerenes, which include water molecules and are floating in water, is expected to become an epoch-making beverage sufficiently addressing requests for improvement of health. Although the reasons why fullerenes which include water molecules are efficacious to health and what kind of bioactive actions they possess are unknown at present, the present invention and others are diligently conducting research to clarify the mechanisms of fullerene efficacies.

BRIEF DESCRIPTION OF THE FIGURE

FIG. 4: Reported physical properties of fullerene

THE BEST MODE FOR CARRYING OUT THE INVENTION

As described above, methods for producing fullerene itself according to an industrial production scale have been established. Among them, a typical production method is that graphite of an electrode is vaporized by arc discharge or laser beam irradiation to generate carbon vapor, the carbon vapor is cooled down to form soot, and fullerenes are generated in soot. Fullerene molecules including metal atoms such as K and La are also produced by vaporizing graphite by arc discharge or laser beam irradiation. The present invention, however, does not relate to a method for producing fullerene itself, but it is characterized in that it relates to production of water containing fullerenes which include water molecules.

Water containing fullerenes which include water molecules, which is obtained by the present invention, is a new product which has not been produced up to this time. The present invention does not use vaporization techniques using are discharge or laser beam irradiation, which are conventionally known. It discloses a new method for producing water containing fullerenes using a combustion method.

After diligent examination in consideration of producing water containing fullerenes efficiently and economically and serving it for drinking, the inventors of the present invention came up with an idea on a method in which hydrogen and oxygen are burned, a pure graphite bar is inserted and heated in a combustion gas generated, and they were able to produce water containing fullerenes by burning hydrogen and oxygen in high-pressure water so that no substances other than water and carbon were not produced by burning hydrogen and oxygen in water.

Because the amount of fullerenes contained in water containing fullerenes, which is obtained by the present invention, is very small and is beyond analysis limits, it cannot be identified easily, but it can be confirmed by precision analysis. Not all carbon constitutes generated in water by the above-mentioned method are fullerenes. Unburned carbon is also included. Because there is a limit for the amount of unburned carbon to be taken for drinking, it is necessary to control reaction time and the amount of fuel to be burned. If the reaction time is short, water produced does not have specific effects. If the reaction time is too long, water tastes bitter and is not suitable for drinking.

As described above, the present invention has newly developed a method for producing water containing fullerenes, which include water molecules and are floating in water being processed, and an apparatus for producing the same.

Figure 1:
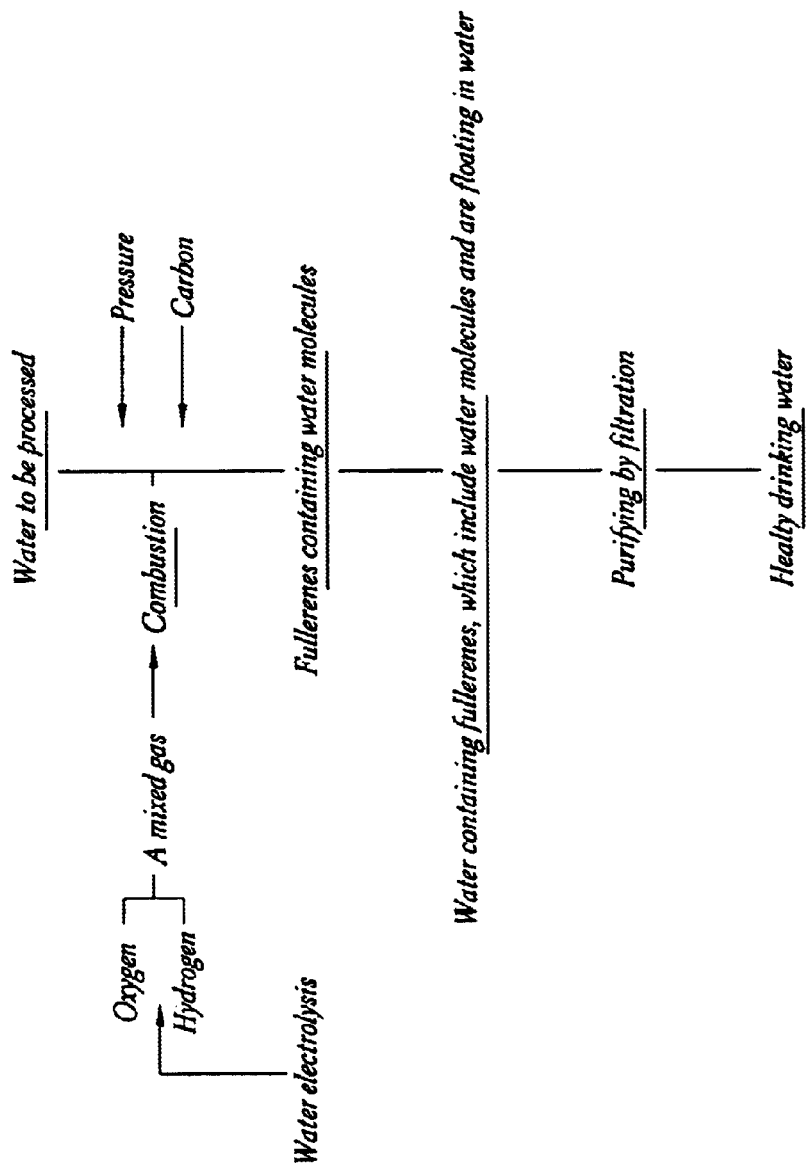
FIG. 1: A flow chart of producing water containing fullerenes according to the present invention
Figure 2:
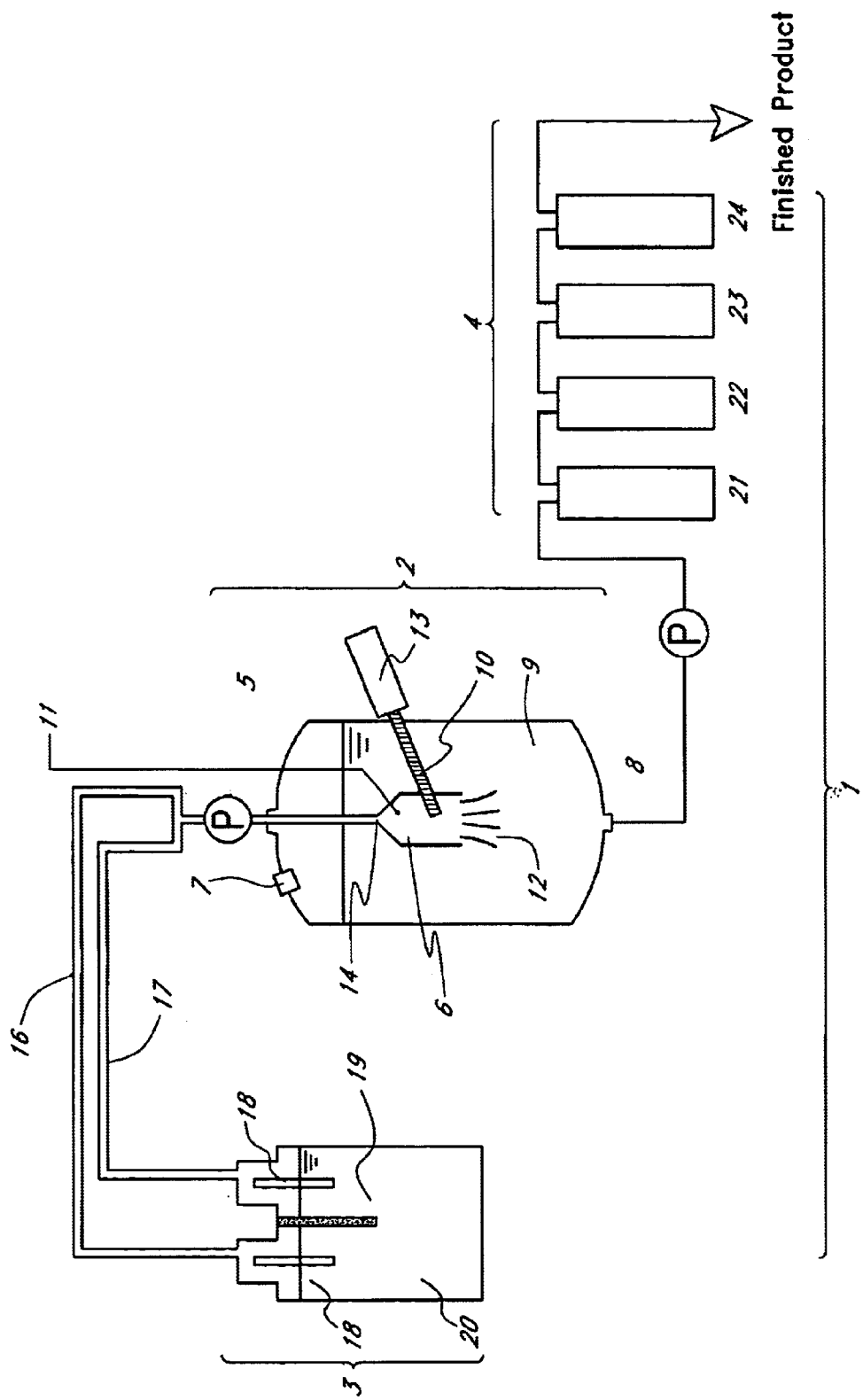
FIG. 2: A schematic sketch of an apparatus for producing water containing fullerenes according to the present invention
Figure 3:
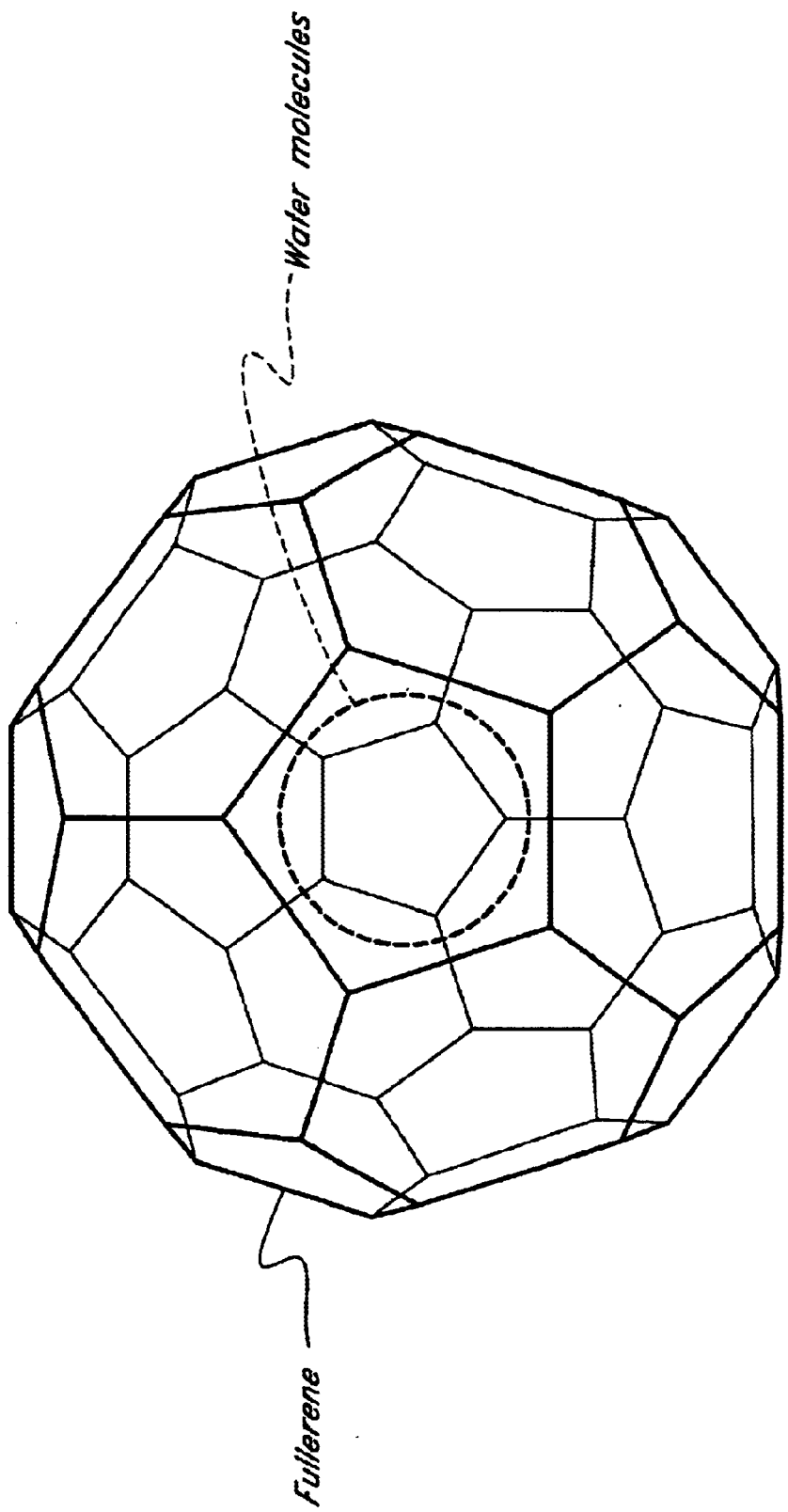
FIG. 3: A crystal structure sketch of water containing fullerenes which include water molecules according to the present invention

Referring to figures, a method and an apparatus according to the present invention are described in detail in the following:

FIG. 1 is a flow chart of producing water containing fullerenes according to the present invention. FIG. 2 is a pressure-resistant container for producing water containing fullerenes according to the invention. FIG. 3 is a crystal structure of water containing fullerenes obtained by the invention. FIG. 4 shows physical properties of fullerene itself.

An apparatus 1 for producing water containing fullerenes according to the invention comprises a pressure-resistant container 2 for producing water containing fullerenes, a water electrolyzer 3 for generating raw material gases and a filtration device 4 for water containing fullerenes.

The basic structure of the pressure-resistant container 2 according to the invention is an apparatus for producing water containing fullerenes, which include water molecules and are floating in water, comprising a tank 5 holding high-pressure water, a jet nozzle 14 for a mixed gas of oxygen and hydrogen, a combustion chamber 6 and a graphite bar 10. To this apparatus, a water electrolyzer 3 to supply raw material gasses, hydrogen and oxygen, and a filtration device 4 for water containing fullerenes obtained are attached.

The pressure-resistant container 2 according to the invention comprises a metal tank, preferably a steel tank 5 holding high-pressure water. In the tank 5 holding high-pressure water, a mixed gas of oxygen and hydrogen, which are generated by the water electrolyzer 3 and are supplied from a hydrogen gas supply path 16 and an oxygen supply path 17, are blown out at high pressure from the jet nozzle 14 into the combustion chamber 6. Inside the combustion chamber 4, a graphite bar 10 is gradually pushed out from a supply cylinder 13 according to the combustion amount. A mixed gas of hydrogen and oxygen is ignited by an ignition system 11 and carbon or fullerenes containing water molecules are discharged in pressurized water 9. The high-pressure water 9 containing these is taken out from an outlet 8 at the bottom of the tank holding high-pressure water and properly is filtrated by the filtration device 4.

Of the above-mentioned, in place of the water electrolyzer 3 for generating raw material gases, high-pressure hydrogen and oxygen gas cylinders can be used. There is, however, an advantage of using the water electrolyzer as used in the present invention over using high-pressure hydrogen gas and oxygen gas cylinders, i.e., oxygen and hydrogen supplied by water electrolysis are completely pure gases, hence raw material gases used as fuel gases can be supplied efficiently.

In the present invention, in an example of generating hydrogen 16 and oxygen 17 by water electrolysis conducted in the water electrolyzer 3 for generating raw material gases for producing water, 18, 18' and 19 respectively show cathode plates and an anode plate. As described above, it is possible to supply hydrogen and oxygen inside the tank holding high-pressure water directly from each high-pressure hydrogen and oxygen gas cylinder.

In this apparatus, a mixed gas is perfectly burned by jetting out hydrogen 16 and oxygen 17 generated by electrolysis into the combustion chamber from the nozzle 14 through the pump, achieving a perfect vapor-gas combustion state at a very high temperature. A pure graphite bar 10 is inserted in this combustion gas, heated and burned. The graphite bar is supplied from inside the cylinder 13 by specific amount according to the amount burned. During the combustion, it is necessary to control a mixing ratio of hydrogen 16 to oxygen 17 to be strictly 2:1. It is also necessary to control a pressure inside the tank holding high-pressure water by providing a pressure control valve.

When carbon 12 heated and burned at a high temperature inside the combustion chamber 6 is discharged from the combustion chamber 4 into the high-pressure water 9, a part of carbon forms a crystal structure. This crystal structure is considered to be a morning-glory-flower-shape like carbon structure consisting of five hexagon structures called "corannulene". Carbon atoms, then, are rearranged, changing to a nearly spherical shape. At this time, one water molecule is taken in and fullerene having a cage structure larger than the water molecule contains the water molecule, changing to a soccer-ball shape, which is energy-wise a stable structure.

Main fullerenes generated by combustion of the graphite bar are of the $C_{60}$ structure. As described above, fullerene having a cage structure larger than a water molecule contains a water molecule. As shown in FIG. 3 as a type sketch, this structure is a state in which a water molecule, which is indicated as a circular dotted line, is contained in a soccer-ball-shaped structure.

As the result that a fullerene structure in this state is generated, it is estimated that stable carbon molecules with exceedingly high hydrophobicity are floating in water, and without using an activating agent, an apparent dissolution state is achieved.

For example, on a production scale of producing one ton of water containing fullerenes, jetting a mixed gas in an injection quantity of approximately 5 L/sec. for approximately two hours is appropriate. If gas pressure applied is excessive, there is a risk of destroying the structure of the apparatus. If gas pressure applied is not sufficient, gas is blown up from the combustion chamber, carbon heated is emitted on the water as it is being covered by a bubble. This worsens generation of fullerenes. A preferable air pressure at this time is approximately 3.5 atmospheres. A pressure of high-pressure water inside the tank holding high-pressure water is set to two atmospheres.

The apparatus is operated in the following manner: High-pressure hydrogen gas 16 and oxygen 17 are jetted from the nozzle 14 through the pump inside the tank holding high-pressure water and are ignited by an ignition system 11, creating a vapor-gas combustion state at a very high temperature. The pure graphite bar 10 is inserted in the combustion gas and is burned.

Further, in this apparatus, not to produce substances other than water and carbon or fullerenes, it makes it requisite to burn hydrogen and oxygen in water. At this time, to burn hydrogen and oxygen purely in water without containing impurities, it is necessary to burn them under high pressure. The position to insert a graphite bar should be within a sphere where a mixed gas is burned perfectly and is vaporized at a completely high temperature. Because fullerenes containing water molecules, which are generated, are carbon molecules with exceedingly high hydrophobicity, they float in water in a stable state and an apparent dissolution state is achieved without using an activating agent. New water containing fullerenes produced in this way is taken out from the outlet and is fed to the filtration system appropriately.

Another characteristic of the present invention is to produce healthy drinking water by purifying water containing fullerenes, which include water molecules and are floating in water, which was produced as described above. Because a large quantity of unburned carbon is floating in the water generated and it is not suitable for drinking as it is, water needs to be purified using a filtration system.

For a filtration method in this case, not to remove carbon or fullerenes generated more than necessary, using a filtration system for producing water suitable for drinking is preferable without using methods such as ion exchange and a reverse osmosis film methods, etc. In other words, a hollow fiber film is preferable as a filter. Filtrating high-pressure water drawn off from the tank holding high-pressure water using a hollow fiber film is preferable from points of view of characteristics of water containing fullerenes and of filter life. By doing this way, drinking water conforms to the Food Hygiene Act can be produced.

Because fullerenes generated are on a scale of nanomicron, it is difficult to be filtrated using a regular filter. A very small quantity of fullerenes is contained in high-pressure water obtained according to the present invention.

Modes for carrying out the present invention is specifically described below based on embodiments, modes for carrying out the present invention, however, are not limited to these.

Modes for Carrying the Invention

FIG. 2 shows a typical embodiment of an apparatus for producing water containing fullerenes, which include water molecules and are floating in water, according to the present invention. The apparatus comprises a tank 5 holding high-pressure water, a jet nozzle 14 for a mixed gas of oxygen and hydrogen and a graphite bar 10.

The tank 5 holding high-pressure water is a pressure-resistant metal tank which is tolerant to ultrahigh pressure. A mixed gas of oxygen and hydrogen supplied from a hydrogen gas supply path 16 and an oxygen supply path 17 is jetted out into a combustion chamber 6 using a jet nozzle 14. A graphite bar 10 is provided inside the combustion chamber from a cylinder 13. It is necessary to control pressure inside the tank holding high-pressure water by a pressure control valve 7. A mixed gas is ignited by an ignition system 11 and fullerenes 12 which include carbon or water molecules are discharged in the high-pressure water. Water containing fullerenes, which include water molecules and are floating in water, is taken out from an outlet 8. The water containing fullerenes taken out is appropriately filtrated by the filtration device 4 (comprising 21~24) and becomes a finished product.

This apparatus is operated in the following manner: As described above, by jetting a mixed gas inside a pressurized tank from the nozzle 14 by supplying hydrogen and oxygen under high pressure, igniting it by an ignition system 11, and perfectly burning it, a vapor-gas combustion state at a very high temperature is achieved. A pure graphite bar 10 is inserted in the combustion gas and is burned. When carbon heated at a high temperature inside the nozzle is discharged into high-pressure water, a part of the carbon forms a crystal structure. Carbon atoms, then, are rearranged, changing to a nearly spherical shape. At this time, a water molecule is taken in and contained. The shape changes to an energy-wise stable soccer-ball shape. Because fullerene containing a water molecule is a carbon molecule with exceedingly high hydrophobicity, it floats in water in a stable state, and without using an activating agent, an apparent dissolution state is achieved.

Thus produced new water containing fullerenes is taken out from an outlet and is fed to a filtration system 4. The filtration system uses hollow fiber films. Passing through hollow fiber films of 50μ, 25μ, 3μ, 0.5μ, and 0.1μ in order, water containing fullerenes with a very small quantity of fullerenes is ultimately obtained.

Conditions for Carrying Out the Invention

Internal pressure of a production tank: 2 atm.

Mixed gas: 5 liters/sec. (3.5 atm.)

Jet time: 2 hrs.

Graphite supplied: 1.5 kg/2 hrs.

Produced water containing fullerenes; approx. 1 ton

By filtrating produced water containing fullerenes using hollow fiber films of 50μ, 25μ, 3μ, 0.5μ, and 0.1μ in order, healthy drinking water containing fullerenes, which include water molecules and are floating in water.

Sampling of the Healthy Drinking Water 52 adults consisting of men and women sampled healthy drinking water containing fullerenes, which include water molecules and are floating in water, to confirm efficacies and effects toward improving health and bioactive functions.

Sampling Conditions and Results

| Sampling amount per day: | |
| --- | --- |
| Up to one glass | 5 persons |
| Up to 3 glasses | 22 |
| 4 glasses or more | 22 |
| Taste: | |
| Tasted nice | 39 |
| No taste | 13 |
| Smell: | |
| Do not mind | 51 |
| Do mind | 1 |
| Efficacy examples: | |
| Physical conditions improved | 22 |
| Appetite improved | 32 |
| Supplementary effect on medicinal action | 11 |
| Constipation relieved | 14 |
| Recovering from fatigue | 49 |
| Blood sugar level lowered | 3 |
| Diarrhea improved | 3 |
| Better digestive functions | 17 |
| Rough skin recovered | 8 |
| Stiff shoulders relieved | 18 |
| Eyestrain recovered | 1 |
| Gout relieved | 1 |
| Blood pressure lowered | 5 |
| Renal calculus relieved | 1 |
| Progress of lung cancer stopped | 1 |

According to the above-mentioned results, at the sampling stage, the number of people who replied "Tasted nice" was nine times more than the number of people who replied "No taste". As for its smell, nearly all respondents replied "Do not mind". From these results, it can be seen that the water containing fullerenes obtained according to the present invention is a beverage which is easy to drink for many people.

Seeing from there were many people who sampled the water containing fullerenes obtained according to the present invention listed effects on health-related improvements such as recovering from fatigue, appetite improved, physical conditions improved, better digestive functions, stiff shoulders relieved, constipation relieved, etc., the water containing fullerenes obtained according to the present invention is considered to exhibit sufficient effects as a healthy beverage.

Industrial Applicability

The present invention provides a method and an apparatus for producing new water containing fullerenes, and healthy drinking water utilizing the new water containing fullerenes. With the invention, fullerenes can be produced in a simplified and efficient manner. Seeing from the sampling test conducted with many monitors, water containing fullerenes, which include water molecules and are floating in water, is remarkably effective as a healthy beverage.

Expectations are also placed on use of water containing fullerenes present invention for improving the body's immune system in addition to its health improvement actions.

What is claimed is:

1. A method for producing water containing fullerenes which includes a mixture of water molecules and fullerenes, comprising the steps of:

burning a mixed gas of oxygen and hydrogen in high-pressure water; and burning a graphite bar using the combustion gas generated, thereby producing fullerenes in water.

2. An apparatus for producing water containing fullerenes which includes a mixture of water molecules and fullerenes, which comprises a tank holding high-pressure water, a jet nozzle for jetting out a mixed gas of oxygen and hydrogen into the tank, a graphite bar, an ignition system for burning the mixed gas, and a combustion chamber for burning the graphite bar using the burning mixed gas.

3. The apparatus as claimed in claim 2, further comprising a water electrolyzer for producing a mixed gas of oxygen and hydrogen.

4. The apparatus as claimed in claims 2, further comprising a filtration system for removing carbon residue.

5. A healthy drinking waater comprising water containing fullerenes obtained by the method of claim 1.

6. The method as claimed in claim 1, further comprising filtrating said water containing fullerenes by a filter to remove carbon residue.

7. The apparatus as claimed in claim 3, further comprising a filtration system for removing carbon residue.

* * * * *